(12) United States Patent
Saito

(10) Patent No.: US 7,401,599 B2
(45) Date of Patent: Jul. 22, 2008

(54) VAPOR-LIQUID SEPARATOR

(75) Inventor: Yasuhiro Saito, Tokoname (JP)

(73) Assignee: Toyota Boshoku Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/763,080

(22) Filed: Jun. 14, 2007

(65) Prior Publication Data

US 2008/0029071 A1 Feb. 7, 2008

(30) Foreign Application Priority Data

Aug. 3, 2006 (JP) ............................. 2006-212639

(51) Int. Cl.
*F02M 33/02* (2006.01)
*F02M 33/04* (2006.01)
(52) U.S. Cl. ...................... 123/518; 123/572
(58) Field of Classification Search ................ 123/518, 123/572, 573, 574; 96/209, 189; 55/320, 55/392
See application file for complete search history.

(56) References Cited

U.S. PATENT DOCUMENTS

| | | | | |
|---|---|---|---|---|
| 4,184,858 A * | 1/1980 | Walker | ........................ | 96/265 |
| 4,269,607 A * | 5/1981 | Walker | ........................ | 95/271 |
| 4,993,517 A * | 2/1991 | Leipelt et al. | ............ | 184/105.1 |
| 5,243,950 A * | 9/1993 | Dalupan | ...................... | 123/573 |
| 5,450,835 A * | 9/1995 | Wagner | ........................ | 123/573 |
| 5,587,068 A * | 12/1996 | Aho et al. | ...................... | 96/210 |
| 6,279,556 B1 * | 8/2001 | Busen et al. | ................. | 123/572 |
| 6,302,933 B1 * | 10/2001 | Krause et al. | ............... | 55/350.1 |
| 6,475,256 B2 * | 11/2002 | Matsubara et al. | ............ | 55/337 |
| 7,007,682 B2 * | 3/2006 | Takahashi et al. | ........... | 123/572 |
| 2004/0040272 A1 * | 3/2004 | Uhlenbrock | .................. | 55/423 |
| 2005/0284299 A1 * | 12/2005 | Lane et al. | ..................... | 96/209 |
| 2006/0112941 A1 * | 6/2006 | Hilpert et al. | ............... | 123/573 |
| 2007/0163442 A1 * | 7/2007 | Saito et al. | ..................... | 96/209 |

FOREIGN PATENT DOCUMENTS

| | | |
|---|---|---|
| EP | 1 669 119 A1 | 6/2006 |
| JP | 5-231121 | 9/1993 |
| JP | 2003-49625 | 2/2003 |
| JP | 2003-120150 | 4/2003 |
| JP | 2005-146972 | 6/2005 |

* cited by examiner

*Primary Examiner*—Mahmoud Gimie
(74) *Attorney, Agent, or Firm*—Oblon, Spivak, McClelland, Maier & Neustadt, P.C.

(57) ABSTRACT

A vapor-liquid separator is disclosed which is capable of improving a dischargeability of a separated liquid and of suppressing a reversed flow. The present vapor-liquid separator comprises a cylindrical separator main body, an introducing part for introducing the vapor-liquid mixed fluid into the separator main body in the tangential direction, a liquid discharging part for discharging a separated liquid, a gas exhausting part for exhausting the separated gas, a storing part for storing a liquid passed through the liquid discharging part, a stored-liquid discharging part provided in the storing part to discharge a stored liquid and a communicating part for communicating the storing part with an upstream side of a vapor-liquid separation region of the separator main body and/or the introducing part.

20 Claims, 6 Drawing Sheets

[Figure 1]
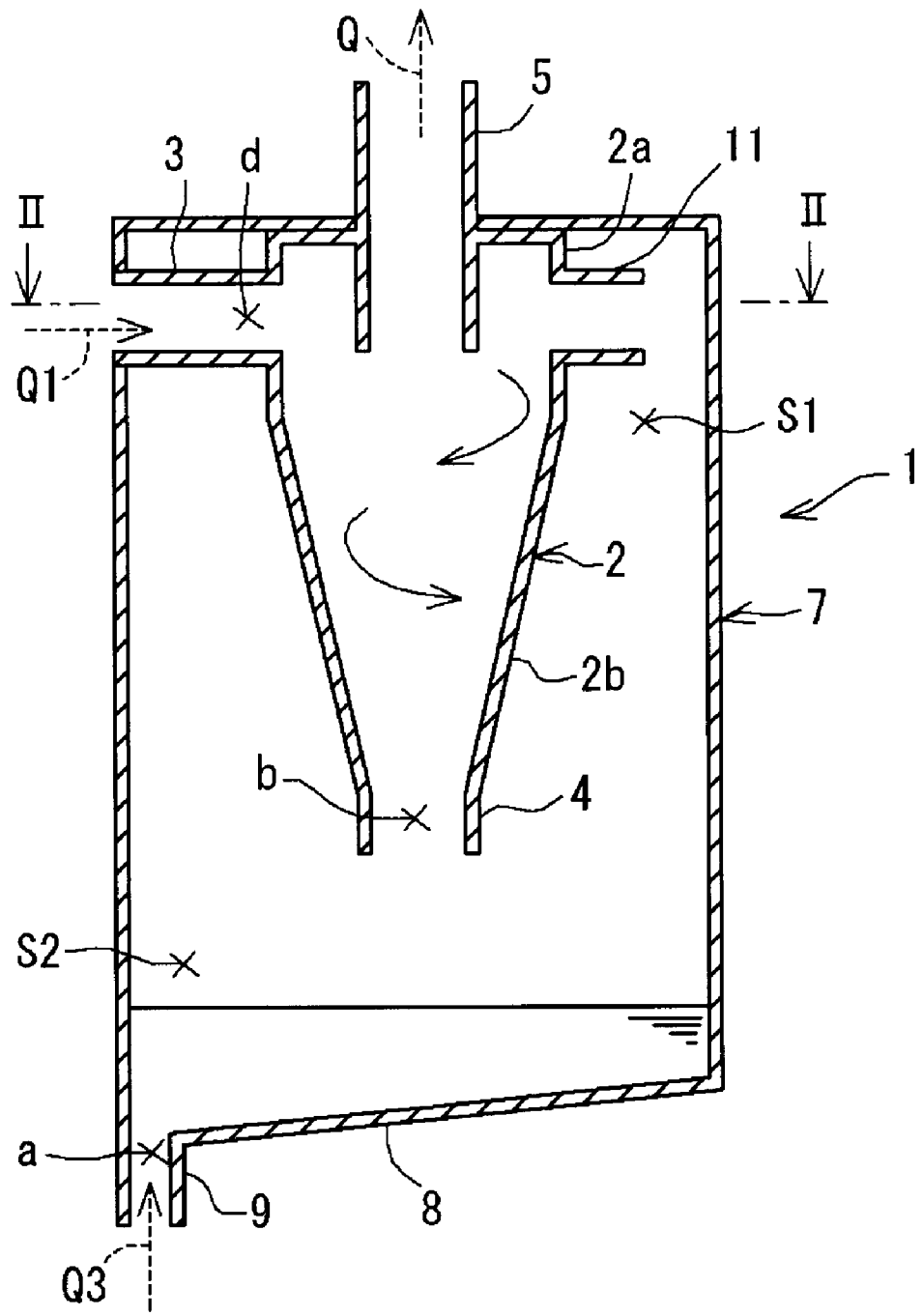

[Figure 2]
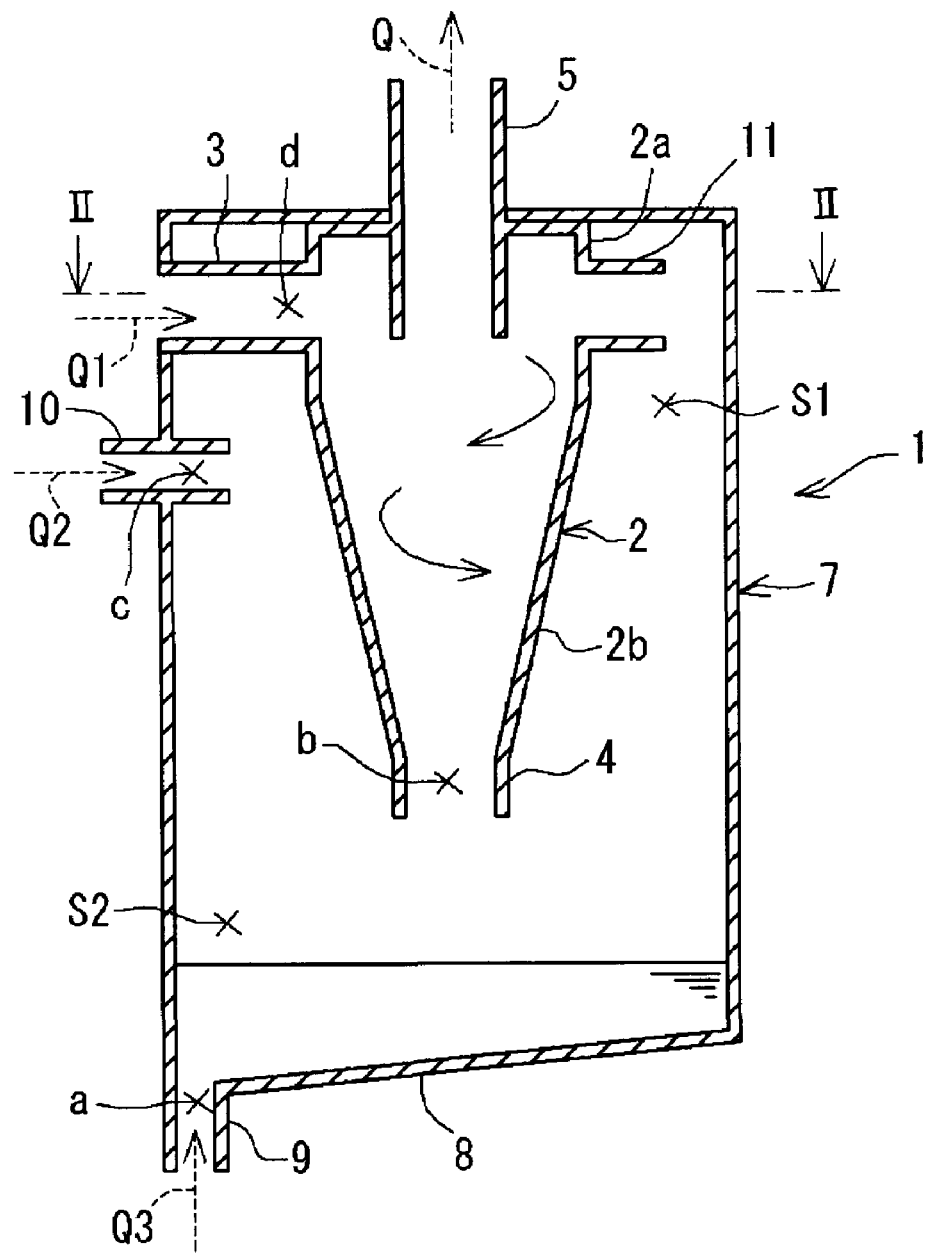

[Figure 3]
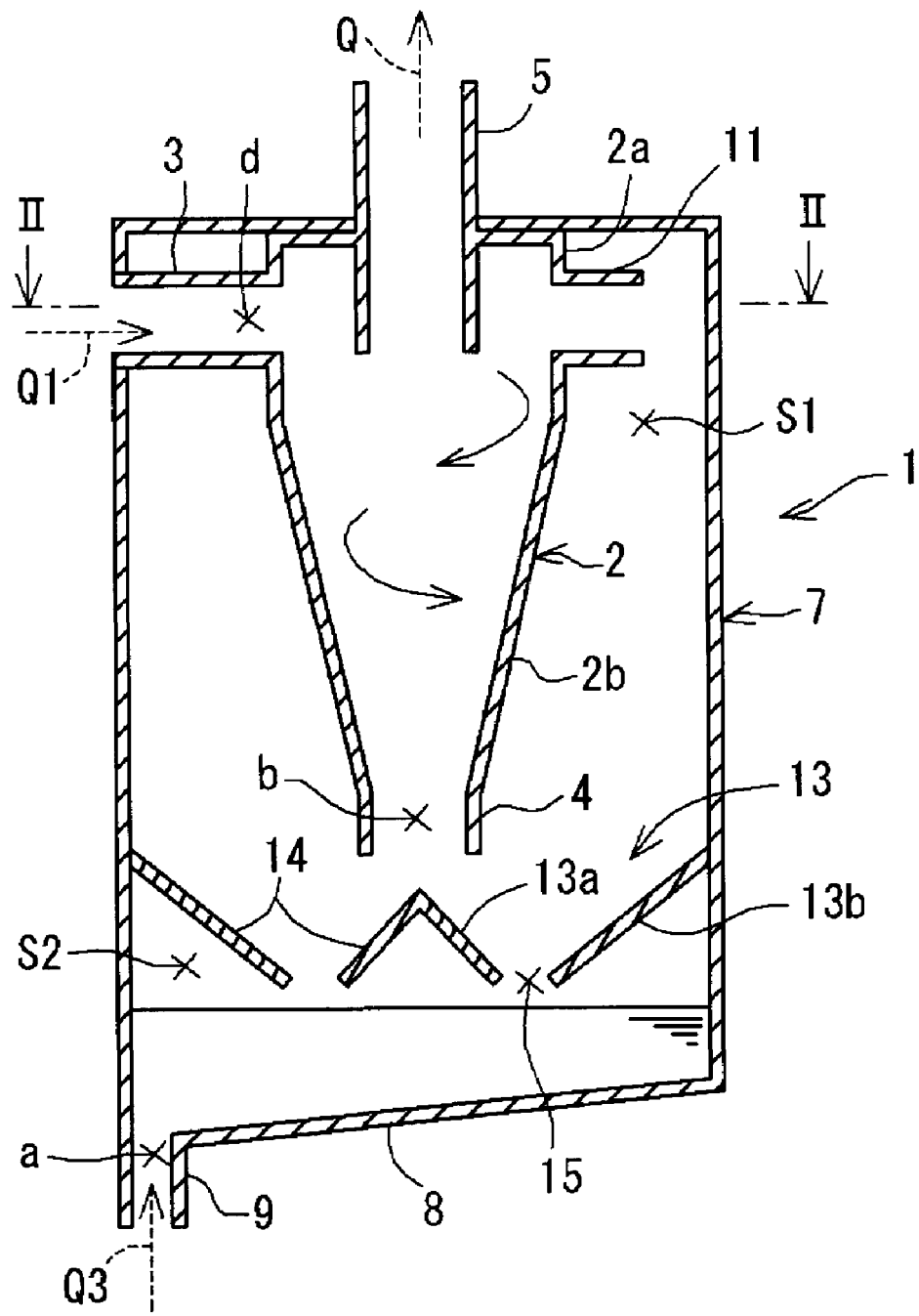

[Figure 4]
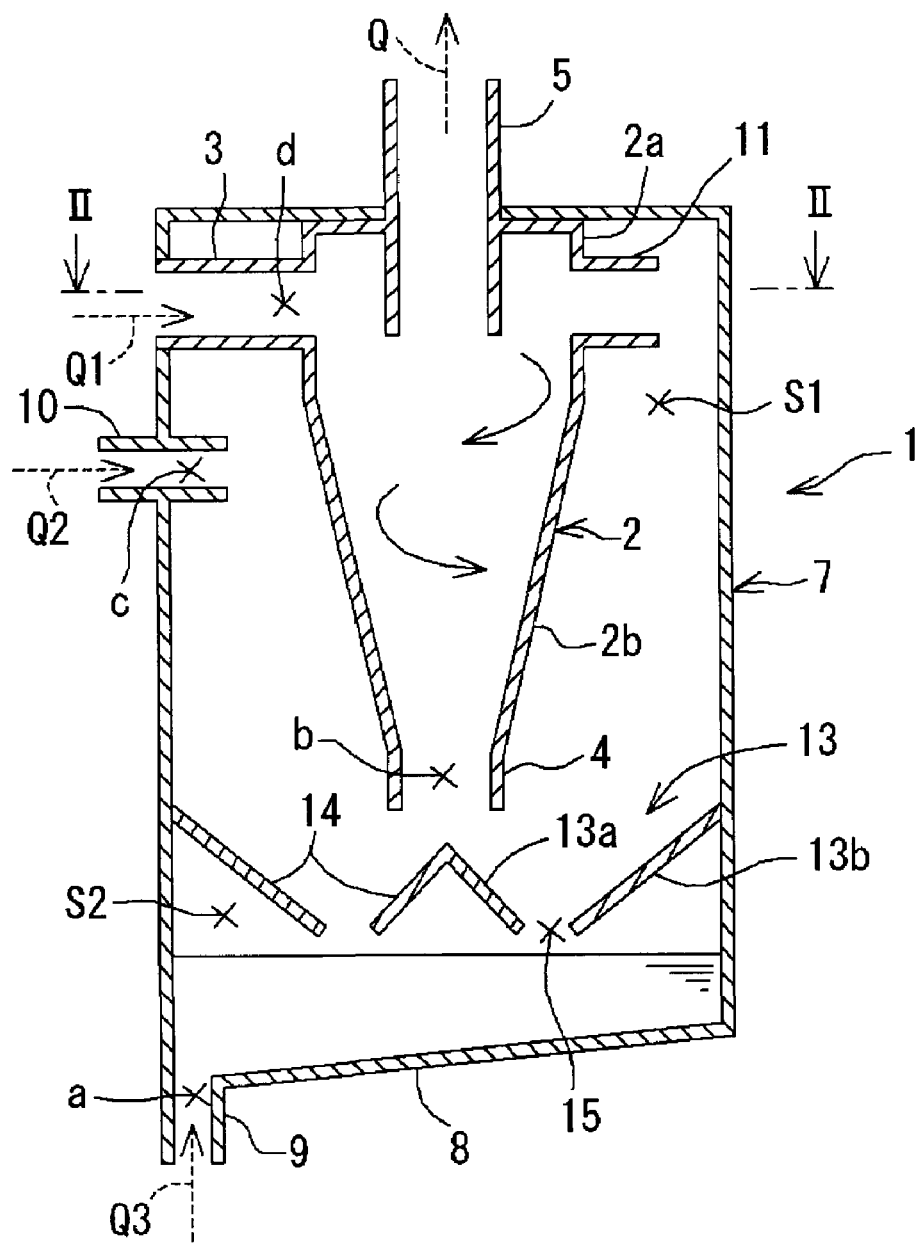

[Figure 5]
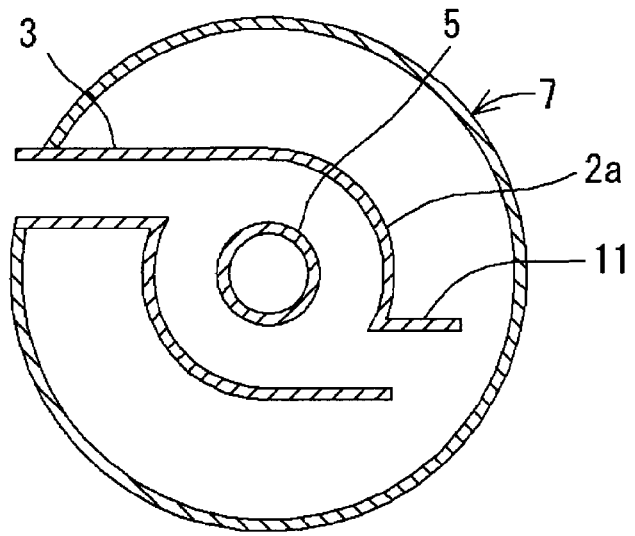
[Figure 6]
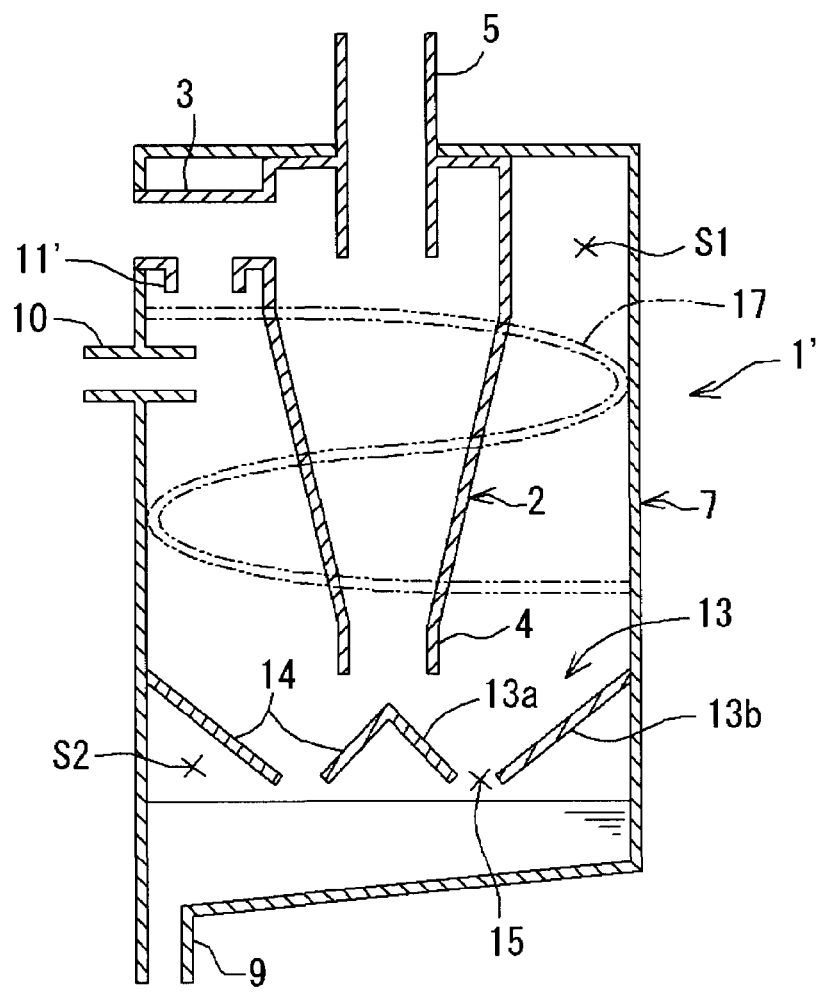

[Figure 7]
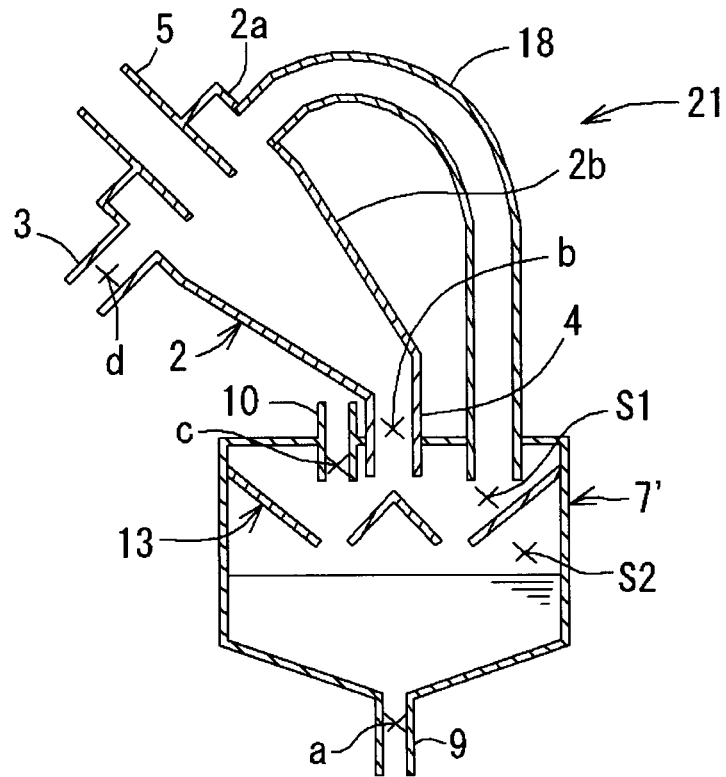
[Figure 8]
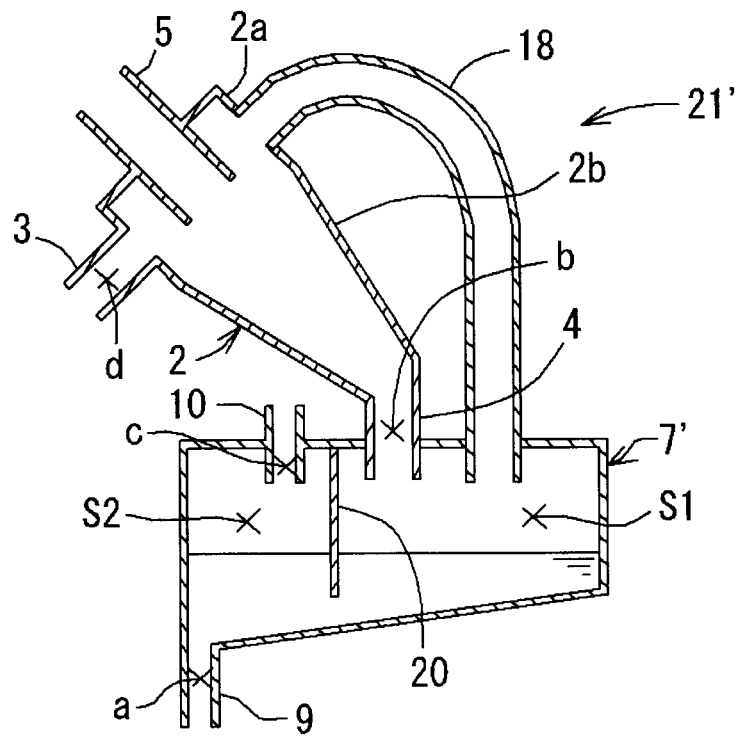

VAPOR-LIQUID SEPARATOR

TECHNICAL FIELD

The present invention relates to a vapor-liquid separator, and more particularly to a vapor-liquid separator capable of improving dischargeability of a separated liquid and of suppressing a reversed flow.

BACKGROUND ART

Conventionally, there has been known a vapor-liquid separator which centrifugally separates a blow-by gas leaking from a combustion chamber of an automotive engine into gas and oil, for example in JP-A 2005-146972 and JP-A 2003-49625.

JP-A 2005-146972 discloses a vapor-liquid separator which is provided with an oil storing tank (6) for improving oil dischargeability, and is provided in an oil discharging port (61) of the oil storing tank (6) with a check valve (7). This check valve closes the oil discharging port (61) during an operation of the engine and opens the oil discharging port (61) at a time of stopping the engine.

In addition, JP-A 2003-49625 discloses a vapor-liquid separator in which a oil discharging port (46) is disposed on a wall of the separator main body.

However, according to the vapor-liquid separator in JP-A 2005-146972, the structure is made such as to store the oil within the tank intermittently during the operation of the engine and a large capacity of tank is necessary. In addition, since the vapor-liquid separator has the check valve and the opening and closing mechanism thereof, and the structure is complicated. Further, there is a risk that a sticking of a valve body, a freezing or the like is generated due to an increase of an oil viscosity, an operation in a cold district or the like.

Moreover, according to the vapor-liquid separator in JP-A 2005-146972, when the hole diameter of the oil discharging hole is large, the oil separated from the oil discharging hole sometimes flows backward at the time of sucking the blow-by gas. On the other hand, when the hole diameter of the oil discharging hole is small, there is a problem that the oil dischargeability is lowered.

DISCLOSURE OF THE INVENTION

Problems to be solved by the Invention

The present invention is accomplished considering the above problems and an objective of the present invention is to provide a vapor-liquid separator capable of improving a dischargeability of a separated liquid and suppressing a reversed flow.

MEANS FOR SOLVING PROBLEMS

The present invention is described as follows.
1. A vapor-liquid separator which comprises a cylindrical separator main body, an introducing part which is provided on the separator main body and is for introducing the vapor-liquid mixed fluid into the separator main body in the tangential direction, a liquid discharging part which is provided on the separator main body and is for discharging a separated liquid, and a gas exhausting part which is provided on the separator main body and is for exhausting a separated gas, the vapor-liquid separator characterized by comprising a storing part for storing a liquid which is discharged from the liquid discharging part, a stored-liquid discharging part which is provided in the storing part and is for discharging a stored liquid, and a communicating part for communicating the storing part with an upstream side of a vapor-liquid separation region of the separator main body and/or the introducing part.
2. The vapor-liquid separator according to paragraph 1 above, wherein the storing part is a housing for covering the separator main body, and wherein the communicating part is a communication pipe which is provided on an upstream side of a vapor-liquid separation region of the separator main body and/or on the introducing part and is communicating with an interior of the housing.
3. The vapor-liquid separator according to paragraph 2 above, further comprising a spiral plate applying a swirling force to a vapor-liquid mixed fluid flowing toward an upstream side of a vapor-liquid separation region of the separator main body and/or the introducing part in the housing.
4. The vapor-liquid separator according to paragraph 2 above, further comprising an intake part which is provided on the storing part and is for suctioning a vapor-liquid mixed fluid existing outside of the storing part.
5. The vapor-liquid separator according to paragraph 4 above, wherein an opening area of the intake part is smaller than an opening area of the introducing part.
6. The vapor-liquid separator according to paragraph 4 above, further comprising a baffling part which is provided in the storing part and is for inhibiting a liquid stored in the storing part from flowing backward to the liquid discharging part.
7. The vapor-liquid separator according to paragraph 6 above, wherein the baffling part has a tapered surface inclined relative to the horizontal face.
8. The vapor-liquid separator according to paragraph 2 above, wherein the vapor-liquid mixed fluid is a blow-by gas.
9. The vapor-liquid separator according to paragraph 1 above, wherein the storing part is a storage tank to which the liquid discharging part of the separator main body is connected, and wherein the communicating part is a communication pipe for communicating the storage tank with an upstream side of a vapor-liquid separation region of the separator main body and/or the introducing part.
10. The vapor-liquid separator according to paragraph 9 above, further comprising an intake part which is provided on the storing part and is for suctioning a vapor-liquid mixed fluid existing outside of the storing part.
11. The vapor-liquid separator according to paragraph 10 above, wherein an opening area of the intake part is smaller than an opening area of the introducing part.
12. The vapor-liquid separator according to paragraph 9 above, further comprising a baffling part which is provided in the storing part and is for inhibiting a liquid stored in the storing part from flowing backward to the liquid discharging part.
13. The vapor-liquid separator according to paragraph 12 above, wherein the baffling part has a tapered surface inclined relative to the horizontal face.
14. The vapor-liquid separator according to paragraph 9 above, wherein the vapor-liquid mixed fluid is a blow-by gas.
15. The vapor-liquid separator according to paragraph 1 above, further comprising an intake part which is provided on the storing part and is for suctioning a vapor-liquid mixed fluid existing outside of the storing part.
16. The vapor-liquid separator according to paragraph 15 above, wherein an opening area of the intake part is smaller than an opening area of the introducing part.

17. The vapor-liquid separator according to paragraph 15 above, wherein the vapor-liquid mixed fluid is a blow-by gas.
18. The vapor-liquid separator according to paragraph 1 above, further comprising a baffling part which is provided in the storing part and is for inhibiting a liquid stored in the storing part from flowing backward to the liquid discharging part.
19. The vapor-liquid separator according to paragraph 18 above, wherein the baffling part has a tapered surface inclined relative to the horizontal face.
20. The vapor-liquid separator according to paragraph 18 above, wherein the vapor-liquid mixed fluid is a blow-by gas.

Effect of the Invention

According to the vapor-liquid separator of the present invention, a vapor-liquid mixed fluid which is introduced into the separator main body in the tangential direction through the introducing part forms a swirling flow and is centrifugally separated into a gas and a liquid. The separated gas is exhausted outside via the gas exhausting part. On the other hand, the separated liquid is discharged passing through the liquid discharging part, is temporarily stored in the storing part and then is discharged outside via the stored-liquid discharging part. Further, a vapor-liquid mixed fluid that has flowed from the stored-liquid discharging part to the storing part at a time of sucking the vapor-liquid mixed fluid flows into an upstream side of a vapor-liquid separation region of the separator main body and/or the introducing part via a communicating part, and is separated into a gas and a liquid in the separator main body.

Since the vapor-liquid separator of the present invention has a storing part to discharge the liquid which is separated by the separator main body while storing as mentioned above, and it is possible to improve the dischargeability of the liquid at the stored-liquid discharging part. In addition, the vapor-liquid separator of the present invention has no valves at the stored-liquid discharging part, and it is possible to achieve a downsizing of the storing part and a simplification of the structure. Further, the vapor-liquid separator of the present invention has a communicating part to introduce the vapor-liquid mixed fluid that flew backward from the stored-liquid discharging part to the storing part into the separator main body and separate into a gas and a liquid, and it is possible to inhibit the stored liquid from splashing due to the reversed flow of the vapor-liquid mixed fluid, and to inhibit the reversed gas from flowing into the liquid discharging part. As a result, it is possible to inhibit the stored liquid from flowing backward into the liquid discharging part of the separator main body, and it is also possible to improve the dischargeability of the liquid at the liquid discharging part.

Further, in the case where the storing part is a housing that covers the separator main body and the communicating part is a communication pipe, a vapor-liquid mixed fluid that has flowed backward to the housing when the vapor-liquid mixed fluid is sucked flows into an upstream side of a vapor-liquid separation region of the separator main body and/or the introducing part via a communicating part, and is separated into a gas and a liquid in the separator main body.

Additionally, in the case where a spiral plate is provided in the housing, it is possible to separate the vapor-liquid mixed fluid into a gas and a liquid outside of the separator main body in the housing.

Moreover, in the case where the storing part is a storage tank to which the liquid discharging part is connected and the communicating part is a communication pipe, a vapor-liquid mixed fluid that has flowed to the storage tank when the vapor-liquid mixed fluid is sucked flows into an upstream side of a vapor-liquid separation region of the separator main body and/or the introducing part via a communicating part, and is separated into a gas and a liquid in the separator main body.

Furthermore, in the case where the gas-liquid mixed fluid is a blow-by gas, it is possible to preferably centrifugally separate the blow-by gas into a gas and an oil.

BRIEF DESCRIPTION OF DRAWINGS

FIG. 1 is a vertical cross-sectional view showing an embodiment of the vapor-liquid separator of the present invention.

FIG. 2 is a vertical cross-sectional view showing another embodiment of the vapor-liquid separator of the present invention.

FIG. 3 is a vertical cross-sectional view showing another embodiment of the vapor-liquid separator of the present invention.

FIG. 4 is a vertical cross-sectional view of the vapor-liquid separator in accordance with the present Example.

FIG. 5 is a cross-sectional view of the II-II cross section in FIG. 4.

FIG. 6 is a vertical cross-sectional view showing another embodiment of the vapor-liquid separator of the present invention.

FIG. 7 is a vertical cross-sectional view showing another embodiment of the vapor-liquid separator of the present invention.

FIG. 8 is a vertical cross-sectional view showing another embodiment of the vapor-liquid separator of the present invention.

DESCRIPTION OF REFERENCE NUMERALS AND SIGNS

In the figures, reference numbers 1, 1', 21 and 21' denote a vapor-liquid separator, 2 denotes a separator main body, 3 denotes an introduction pipe, 4 represents an oil discharging pipe, 5 indicates a gas exhausting pipe, 7 denotes a housing, 7' represents a storage tank, 9 indicates a stored-oil discharging pipe, 10 denotes an intake pipe, 11 and 11' denote a communication pipe, 13 indicates a baffling part, 13a denotes a first baffling part, 13b indicates a second baffling part, 18 denotes a communication pipe, and 20 indicates a partition wall.

DETAILED DESCRIPTION OF THE PREFERRED EMBODIMENTS

The vapor-liquid separator of the present invention is an apparatus for separating the vapor-liquid mixed fluid into a gas and a liquid, and comprises a separator main body, an introducing part, a liquid discharging part, a gas exhausting part, a storing part, a stored-liquid discharging part and a communicating part (refer to FIG. 1). This vapor-liquid separator may further comprise at least one part among an intake part and a baffling part that are to be described.

The intended use and the like for the vapor-liquid separator of the present invention are not particularly limited, however, the vapor-liquid separator is preferably used, for example, for centrifugally separating a blow-by gas of a vehicle engine into a gas and an oil.

The above-mentioned "separator main body" is not particularly limited in its structure, shape, material and the like so far as it is formed in a tubular shape, however, it is generally in cylindrical.

When the vapor-liquid mixed fluid is introduced into the separator main body, the fluid is swirled and centrifugally separated into a gas and a liquid.

The above-mentioned separator main body may comprise, for example, a cylinder portion (2a) and a tapered cylinder portion (2b) connected to one end side of this cylinder portion (2a) (refer to FIGS. 1-4, 6, 7 and 8).

The above-mentioned "introducing part" is not particularly limited in its structure, shape, material, position and the like so far as it is connected to the separator main body and is capable of introducing a vapor-liquid mixed fluid into the separator main body in the tangential direction.

The above-mentioned introducing part may for example be an introduction pipe (3) which is connected to an upper portion of the separator main body and extends in the tangential direction of a circumference of the cylinder portion (2a) constituting the separator main body (refer to FIG. 5), an introduction pipe which is connected to an upper portion of the separator main body and extends in the tangential direction of a circumference of the tapered cylinder portion (2b) constituting the separator main body, and the like.

The above-mentioned "liquid discharging part" is not particularly limited in its structure, shape, material and the like so far as it is connected to a lower portion of the separator main body and is able to discharge the separated liquid.

The above-mentioned liquid discharging part may for example be a liquid discharge pipe (4) connected to the lower portion of the separator main body (refer to FIGS. 1-4, 6, 7 and 8).

The liquid discharging part may be arranged in such a manner as to be open to a center side of a storing part mentioned below. Accordingly, it is possible to inhibit a liquid surface of the liquid stored in the storing part from being inclined, and inhibit the liquid from flowing backward to the liquid discharging part, at a time when the vehicle travels on a slope.

The above-mentioned "gas exhausting part" is not particularly limited in its structure, shape, material and the like so far as it is connected to the separator main body and is able to exhaust the separated gas.

The above-mentioned gas exhausting part may for example be a gas exhausting pipe (5) that extends in the axial direction in the separator main body (refer to FIGS. 1-4, 6, 7 and 8).

The above-mentioned "storing part" is not particularly limited in its structure, shape, material and the like so far as it is able to store the liquid which is discharged passing through the liquid discharging part.

Examples of the above-mentioned storing part include [1] an embodiment of a housing (7) which covers the separator main body and stores the liquid in a bottom portion of the housing (7) (refer to FIGS. 1-4 and 6), [2] an embodiment of a storage tank (7') which is connected to the liquid discharging part of the separator main body (refer to FIGS. 7 and 8), and the like.

The housing in accordance with the embodiment [1] may for example be a head cover constituting the vehicle engine.

In the case of the embodiment [2] mentioned above, the liquid discharging part may for example be a liquid discharging pipe that extends from a wall of the storing part to at least an interior of the storing part.

The above-mentioned "stored-liquid discharging part" is not particularly limited in its structure, shape, material and the like so far as it is provided in a lower portion of the storing part mentioned above and is able to discharge the stored liquid.

The above-mentioned stored-liquid discharging part may for example be a stored-liquid discharging pipe (9) that is provided in a lower portion of the storing part mentioned above (refer to FIGS. 1-4, 6, 7 and 8).

The above-mentioned stored-liquid discharging part may be arranged, for example, in a leading end side of a tapered portion or an inclined portion of a bottom wall of the storing part. Accordingly, it is possible to further improve the dischargeability of the stored liquid.

An opening area (a) of the stored-liquid discharging part mentioned above may be set, for example, to a value smaller than an opening area (b) of the liquid discharging part mentioned above (refer to FIGS. 1-4, 6, 7 and 8).

The above-mentioned "communicating part" is not particularly limited in its structure, shape, material, position and the like so far as it is be able to communicate the storing part mentioned above with an upstream side of a vapor-liquid separation region of the separator main body and/or the introducing part.

In the case where the storing part mentioned above is the housing (7), the communicating part may for example be communication pipes (11) and (11') which are provided in an upstream side of a vapor-liquid separation region of the separator main body and/or the introducing part and are open to an interior of the housing (7) (refer to FIGS. 1-4 and 6). This communication pipe (11) may be one that extends in the tangential direction of a circumference of the cylinder portion (2a) constituting the separator main body (refer to FIG. 5). In addition, the communication pipe (11) may be one that is connected to an upper portion of the separator main body and extends in the tangential direction of a circumference of the tapered cylinder portion (2b) constituting the separator main body. The above-mentioned communicating part may be disposed at an upstream side of a vapor-liquid separation region of the separator main body and at the introducing part thereof.

In the above case, a spiral plate (17) may be provided in the housing (7) for applying a swirling force to the vapor-liquid mixed fluid that flows toward the upstream side of the vapor-liquid separation region of the separator main body and/or the introducing part (refer to FIG. 6). For example, the spiral plate (17) may be fixed to an inner wall of the housing (7) or to an outer wall of the separator main body (2).

Additionally, in the case where the storing part mentioned above is the storage tank (7'), the communicating part mentioned above may for example be a communication pipe (18) communicating the storage tank with the upstream side of the vapor-liquid separation region of the separator main body and/or the introducing part (refer to FIGS. 7 and 8). The communication pipe (18) may be formed in a spiral shape. Accordingly, it is possible to centrifugally separate the vapor-liquid mixed fluid in the communication pipe (18).

The above-mentioned "intake part" is not particularly limited in its structure, shape, material and the like so far as it is arranged in the upper portion of the storing part mentioned above and sucks a vapor-liquid mixed fluid which is outside of the storing part.

The above-mentioned intake part may for example be an intake pipe (10) provided in an upper portion of the storing part mentioned above in the case where the storing part is the housing (7). This intake pipe (10) may be formed in such a manner as to extend from a wall of the storing part to at least an interior of the storing part.

Further, in the case where the storing part is the storage tank (7') as shown in FIGS. 7 and 8, the intake part may be an intake pipe (10) that is formed on an upper wall of the storage portion so as to be open in the vertical direction. This intake pipe (10) may be arranged, for example, near the liquid discharging part which is open to a center side of the storing part (refer to FIG. 7). Accordingly, it is possible to inhibit the liquid surface of the liquid stored in the storing part from being inclined at a time when the vehicle travels on a slope, and inhibit the liquid from flowing backward to the intake part.

Moreover, the above-mentioned intake part may be formed on a peripheral wall of the storing part shown in FIGS. 7 and 8, while being open in the transverse direction.

An opening area (c) of the intake part mentioned above may be set, for example, to a value smaller than an opening area (d) of the introducing part mentioned above (refer to FIGS. 2, 4, 6, 7 and 8).

The above-mentioned "baffling part" is not particularly limited in its structure, shape, material and the like so far as it is provided in the storing part mentioned above and inhibits the stored liquid in the storing part from flowing backward to the liquid discharging part.

The above-mentioned baffling part may be fixed to an inner wall of the storing part mentioned above or to the separator main body mentioned above.

Examples of the shape of the baffling part include a flat plate shape, a curved plate shape, a lump shape, an irregular shape and the like.

The above-mentioned baffling part may comprise a first baffling part (13a) facing to the opening of the liquid discharging part mentioned above (refer to FIGS. 3, 4, 6 and 7). The first baffling part (13a) may have an area larger than an opening area of the liquid discharging part.

Examples of the above-mentioned baffling part include [1] an embodiment wherein the first baffling part (13a) and a second baffling part (13b) that is provided around the first baffling part (13a) are provided, and a space in the storing part is divided vertically into a space (S1) on the liquid discharging part side and a space (S2) on the stored-liquid discharging part side by the first baffling part (13a) and the second baffling part (13b) (refer to FIGS. 3, 4, 6 and 7), [2] an embodiment having a partition wall (20) dividing a space in the storing part laterally into a space (S1) on the liquid discharging part side and a space (S2) on the stored-liquid discharging part side (refer to FIG. 8), and the like.

In the embodiment [1] mentioned above, at least one baffling part of the first baffling part (13a) and the second baffling part (13b) may have a tapered surface (14) inclining relative to the horizontal face (refer to FIGS. 3, 4, 6 and 7). This tapered surface leads to a smooth guidance of a liquid passed through the liquid discharging part of the separator main body to the bottom side of the storing part.

Embodiment

The present invention will be described in detail hereinafter using Example with some drawings.

In the present Example given here, a vapor-liquid separator separating centrifugally a blow-by gas of a vehicle engine into a gas and an oil is exemplified as the "vapor-liquid separator" of the present invention.

EXAMPLE

[1] Vapor-Liquid Separator

A vapor-liquid separator (1) in accordance with the present Example provides an approximately cylindrical separator main body (2), as shown in FIGS. 4 and 5. This separator main body (2) has a cylinder portion (2a) and a tapered cylinder portion (2b) connected to a lower end side of this cylinder portion (2a). On a peripheral wall of the cylinder portion (2a), an introduction pipe (3) (exemplified as the "introducing part" of the present invention) that extends in the tangential direction of a circumference of the cylinder portion (2a) constituting the separator main body (2) is provided as shown in FIG. 5. In addition, on a peripheral wall of the cylinder portion (2a), a communication pipe (11) (exemplified as the "communicating part" of the present invention) that extends in the tangential direction of a circumference of the cylinder portion (2a) constituting the separator main body (2) is provided being in parallel to the introduction pipe (3). This communication pipe (11) is open to an interior of a housing mentioned below. Further, on a lower end side of the tapered cylinder portion (2b), an oil discharging pipe (4) (exemplified as the "liquid discharging part" of the present invention) is provided being open to the center of the housing mentioned below. Moreover a gas exhausting pipe (5) (exemplified as the "gas exhausting part" of the present invention) that communicates the interior of the separator main body (2) with the exterior and extends in the vertical direction (a direction of a swirling axis) in the separator main body (2) is provided at the center of an upper wall of the separator main body (2).

The above-mentioned vapor-liquid separator (1) has an approximately cylindrical housing (7) (exemplified as the "storing part" of the present invention) covering the separator main body (2) wholly. A bottom wall of the housing (7) is provided with a stored-oil discharging pipe (9) (exemplified as the "stored-liquid discharging part" of the present invention) in a leading end side of the tapered portion (8). An opening area (a) of the stored-oil discharging pipe (9) is set to a value smaller than an opening area (b) of the oil discharging pipe (4) mentioned above.

On an upper portion of a peripheral wall of the housing (7), an intake pipe (10) (exemplified as the "intake part" of the present invention) that extends from the wall to inside and outside of the housing (7) is provided. An opening area (c) of the intake pipe (10) is set to a value smaller than an opening area (d) of the introduction pipe (3) mentioned above.

In the housing (7) mentioned above, there is provided a baffling part (13) inhibiting the stored oil from flowing backward into the separator main body (2) through the oil discharging pipe (4). The baffling part (13) consists of a first baffling part (13a) which is umbrella-shaped and a second baffling part (13b) which has a tapered cylindrical shape. The first baffling part (13a) is arranged while facing to an opening of the oil discharging pipe (4). Additionally, the second baffling part (13b) is fixed to an outside of the first baffling part (13a) via a support rib (not shown) and the like. An outer circumferential side of the second baffling part (13b) is fixed to an inner wall of the housing (7). A tapered surface (14) inclining relative to the horizontal face is formed on upper surfaces of the first baffling part (13a) and the second baffling part (13b). A space in the housing (7) is divided vertically into a space (S1) on the oil discharging pipe (4) side and a space (S2) on the stored-oil discharging pipe (9) side by the first baffling part (13a) and second baffling part (13b). A communication port (15) that communicates both the spaces (S1) and (S2) is provided between the first baffling part (13a) and the second baffling part (13b).

(2) Function of Vapor-Liquid Separator

In the following, a description will be given of a function of the above-mentioned vapor-liquid separator (1).

When a blow-by gas leaked from a combustion chamber of a vehicle engine is introduced into the separator main body (2) via the introduction pipe (3) in the tangential direction, the introduced blow-by gas forms a swirling flow and are centrifugally separated into a gas and an oil (oil mist). The separated gas is exhausted outside via the gas exhausting pipe (5). On the other hand, the separated oil flows toward a lower side of the separator main body (2) along an inner peripheral surface on the basis of its own weight and is temporarily stored in a bottom portion of the housing (7) through the oil discharging pipe (4). After that, if the suction force of the blow-by gas flowing backward from the stored-oil discharging pipe (9) becomes smaller than the weight of the stored oil at a time of an idling or the like, the stored oil is discharged outside via the stored-oil discharging pipe (9).

In the case of sucking a blow-by gas, the blow-by gas is sucked into the housing (7) via the intake pipe (10) and the suction force of the blow-by gas flowing backward from the stored-oil discharging pipe (9) of the housing (7) is weakened. In addition, the blow-by gas flowing backward from the stored-oil discharging pipe (9) into the housing (7) flows into an upstream side of the vapor-liquid separation region of the separator main body (2) via the communication pipe (11) so as to be separated into a gas and an oil in the separator main body (2). Further, it is possible to inhibit the oil stored in the housing (7) from flowing backward to the oil discharge pipe (4) by the first baffling part (13a) and the second baffling part (13b).

It is noted that, a suction force (negative pressure) (Q) applied to the gas exhausting pipe (5) is obtained by a total of a suction force (Q1) of the introduction pipe (3), a suction force (Q2) of the intake pipe (10) and a suction force (Q3) of the stored-oil discharging pipe (9), at the time of sucking the blow-by gas.

(3) Effect of Example

Since the vapor-liquid separator (1) of the present Example has the housing (7), the separated oil obtained by the separator main body (2) is discharged while storing and the dischargeability of the oil at the stored-oil discharging part (9) of the housing (7) is improved. In addition, since the stored-oil discharging pipe (9) of the housing (7) is not provided with a conventional valve mechanism which obtains a closed state during the operation, it is possible to discharge the stored oil in the housing (7) even under operation and to lead to a downsizing of the housing (7) and a simplification of the structure.

Further, since the structure is made so as to suck the blow-by gas into the housing (7) by means of the intake pipe (10), it is possible to suppress a reversed flow of the blow-by gas from the stored-oil discharging pipe (9) and to inhibit the stored oil from splashing due to the reversed flow of the blow-by gas. As a result, it is possible to inhibit the stored oil from flowing backward to the oil discharging pipe (4) of the separator main body (2) and to improve the oil dischargeability at the oil discharging pipe (4) of the separator main body (2).

Additionally, since the opening area (c) of the intake pipe (10) is set to the smaller value than the opening area (d) of the introduction pipe (3), it is possible to suppress the intake amount of the blow-by gas from the intake pipe (10) to a minimum level. Therefore, it is possible to introduce most of the blow-by gas into the separator main body (2) via the introduction pipe (3) and to separate into a gas and an oil.

Further, since the opening area (a) of the stored-oil discharging pipe (9) is set to the smaller value than the opening area (b) of the oil discharging pipe (4), it is possible to more securely suppress the reversed flow of the blow-by gas to the stored-oil discharging pipe (9) and to further improve the oil dischargeability at the oil discharging pipe (4).

Furthermore, since the structure is made such as to flow the reversed blow-by gas into the housing (7) via the stored-oil discharging pipe (9) into the separator main body (2) by means of the communication pipe (11) and separate into a gas and an oil, it is possible to inhibit the stored oil from splashing due to the reversed blow-by gas and to inhibit the reversed flow into the oil discharging pipe (4). As a result, it is possible to more securely suppress the backflow of the stored oil into the oil discharging pipe (4) of the separator main body (2) and to further improve the oil dischargeability at the oil discharging pipe (4) of the separator main body (2).

Further, since the first baffling part (13a) facing to the opening of the oil discharging pipe (4) and the second baffling part (13b) are provided in the housing (7) to divide the internal space of the housing (7) into two spaces (S1) and (S2), it is possible to more securely suppress the backflow of the stored oil into the oil discharging pipe (4) of the separator main body (2) and to further improve the oil dischargeability at the oil discharging pipe (4) of the separator main body (2).

Moreover, since the first baffling part (13a) and the second baffling part (13b) have the tapered surface (14) inclined relative to the horizontal face, it is possible to smoothly guide the oil discharged via the oil discharging pipe (4) of the separator main body (2) to the bottom portion of the housing (7) by means of the tapered surfaces (14).

It is noted that the present invention is not limited to the Example mentioned above and may employ embodiments which are variously modified within the scope of the present invention in correspondence to a purpose and an intended use.

For example, the communication pipe (11) is provided in the cylinder portion (2a) of the separator main body (2) in the Example mentioned above (refer to FIG. 4), however, the structure is not limited to this embodiment and the communication pipe (11) may be provided in the upper portion of the tapered cylinder portion (2b) of the separator main body (2), or a communication pipe (11') may be provided in the middle of the introduction pipe (3), as shown in FIG. 6.

In addition, the structure may be made such that an inner wall of the housing (7) in the Example mentioned above is provided with a spiral plate (17) for applying a swirling force to the blow-by gas flowing in the housing (7) shown in FIG. 6. Accordingly, it is possible to separate the blow-by gas into a gas and an oil by the spiral plate (17) even in the housing (7).

Further, the housing (7) is exemplified as the storing part in the Example mentioned above, however, the structure is not limited to this embodiment and a storage tank (7') to which the oil discharging pipe (4) of the separator main body (2) is connected, as shown in FIGS. 7 and 8. In this case, there may be provided with a communication pipe (18) that communicates the cylinder portion (2a) of the separator main body (2) (or the upper portion of the tapered cylinder portion (2b)) and the storage tank (7'), or may be provided with a communication pipe (not shown) that communicates the introduction pipe (3) with the storage tank (7'). Even in this case, the baffling part (13) may be provided in the storage tank (7').

Moreover, according to the Example mentioned above, the baffling parts (13) consisting of the first baffling part (13a) and the second baffling part (13b) are provided to divide the internal space of the storing part vertically into two spaces (S1) and (S2) shown in FIG. 4, however, the structure is not limited to this embodiment and a partition wall (20) may be provided for dividing the internal space of the storing part laterally into two spaces (S1) and (S2) as shown in FIG. 8.

Further, there is exemplified the aspect that one intake pipe (10) is provided in the storing part according to the Example mentioned above, however, the structure is not limited to this embodiment and a plurality of intake pipes may be provided in the storing part. In this case, it is preferable that the total of the opening areas of a plurality of intake pipes is set to the smaller value than the opening area of the introduction pipe.

INDUSTRIAL APPLICABILITY

The present invention is widely utilized as a technique of centrifugally separating the vapor-liquid mixed fluid into a gas and a liquid. In particular, the present invention is preferably utilized as a technique of centrifugally separating a blow-by gas of a vehicle engine into a gas and an oil.

The invention claimed is:

1. A vapor-liquid separator which comprises:
   a cylindrical separator main body,
   an introducing part which is provided on said separator main body and is configured for introducing said vapor-liquid mixed fluid into said separator main body in a tangential direction,
   a liquid discharging part which is provided on said separator main body and is configured for discharging a separated liquid, and
   a gas exhausting part which is provided on said separator main body and is configured for exhausting a separated gas,
   said vapor-liquid separator comprising a storing part configured for storing a liquid which is discharged from said liquid discharging part, a stored-liquid discharging part which is provided in said storing part and is configured for discharging a stored liquid, and a communicating part configured for communicating said storing part with an upstream side of a vapor-liquid separation region of said separator main body and which extends in a tangential direction of a circumference of said separator main body.

2. The vapor-liquid separator according to claim 1,
   wherein said storing part comprises a housing for covering said separator main body, and
   wherein said communicating part is a communication pipe which is provided on an upstream side of a vapor-liquid separation region of said separator main body and is communicating with an interior of said housing.

3. The vapor-liquid separator according to claim 2, further comprising a spiral plate configured for applying a swirling force to a vapor-liquid mixed fluid flowing toward an upstream side of a vapor-liquid separation region of said separator main body in said housing.

4. The vapor-liquid separator according to claim 2, further comprising an intake part which is provided on said storing part and is configured for suctioning a vapor-liquid mixed fluid existing outside of said storing part.

5. The vapor-liquid separator according to claim 4,
   wherein an opening area of said intake part is smaller than an opening area of said introducing part.

6. The vapor-liquid separator according to claim 2, further comprising a baffling part which is provided in said storing part and is configured for inhibiting a liquid stored in said storing part from flowing backward to said liquid discharging part.

7. The vapor-liquid separator according to claim 6,
   wherein said baffling part has a tapered surface inclined relative to the horizontal face.

8. The vapor-liquid separator according to claim 2,
   wherein said vapor-liquid mixed fluid comprises a blow-by gas.

9. The vapor-liquid separator according to claim 1,
   wherein said storing part is a storage tank to which said liquid discharging part of said separator main body is connected, and
   wherein said communicating part comprises a communication pipe configured for communicating said storage tank with an upstream side of a vapor-liquid separation region of said separator main body.

10. The vapor-liquid separator according to claim 9, further comprising an intake part which is provided on said storing part and is configured for suctioning a vapor-liquid mixed fluid existing outside of said storing part.

11. The vapor-liquid separator according to claim 10,
    wherein an opening area of said intake part is smaller than an opening area of said introducing part.

12. The vapor-liquid separator according to claim 9, further comprising a baffling part which is provided in said storing part and is configured for inhibiting a liquid stored in said storing part from flowing backward to said liquid discharging part.

13. The vapor-liquid separator according to claim 12,
    wherein said baffling part has a tapered surface inclined relative to the horizontal face.

14. The vapor-liquid separator according to claim 9,
    wherein said vapor-liquid mixed fluid comprises a blow-by gas.

15. The vapor-liquid separator according to claim 1, further comprising an intake part which is provided on said storing part and is configured for suctioning a vapor-liquid mixed fluid existing outside of said storing part.

16. The vapor-liquid separator according to claim 15,
    wherein an opening area of said intake part is smaller than an opening area of said introducing part.

17. The vapor-liquid separator according to claim 15,
    wherein said vapor-liquid mixed fluid comprises a blow-by gas.

18. The vapor-liquid separator according to claim 1, further comprising a baffling part which is provided in said storing part and is configured for inhibiting a liquid stored in said storing part from flowing backward to said liquid discharging part.

19. The vapor-liquid separator according to claim 18,
    wherein said baffling part has a tapered surface inclined relative to a horizontal face of said separator main body.

20. The vapor-liquid separator according to claim 18,
    wherein said vapor-liquid mixed fluid comprises a blow-by gas.

* * * * *